(12) United States Patent
Migita et al.

(10) Patent No.: US 12,275,330 B2
(45) Date of Patent: Apr. 15, 2025

(54) VEHICLE AND VEHICLE CONTROL METHOD

(71) Applicant: TOYOTA JIDOSHA KABUSHIKI KAISHA, Toyota (JP)

(72) Inventors: Tsubasa Migita, Sakai (JP); Hiroshi Nagase, Nagoya (JP); Yoichi Ogura, Sunto-gun (JP); Daisuke Mukai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/467,154

(22) Filed: Sep. 14, 2023

(65) Prior Publication Data

US 2024/0157849 A1    May 16, 2024

(30) Foreign Application Priority Data

Nov. 14, 2022 (JP) ................... 2022-181859

(51) Int. Cl.
*B60L 58/27* (2019.01)
*B60L 58/12* (2019.01)
*H01M 10/0562* (2010.01)
*H01M 50/249* (2021.01)

(52) U.S. Cl.
CPC .............. *B60L 58/27* (2019.02); *B60L 58/12* (2019.02); *H01M 10/0562* (2013.01); *H01M 50/249* (2021.01); *B60L 2240/545* (2013.01); *B60L 2240/547* (2013.01)

(58) Field of Classification Search
CPC .... B60L 58/27; B60L 58/12; B60L 2240/545; B60L 2240/547; H01M 50/249; H01M 10/0562

USPC .......................................................... 307/9.1
See application file for complete search history.

(56) References Cited

U.S. PATENT DOCUMENTS

| | | | |
|---|---|---|---|
| 2014/0091748 A1* | 4/2014 | Hermann | H02J 7/00 320/130 |
| 2019/0190066 A1* | 6/2019 | Imade | H01M 10/613 |
| 2019/0198937 A1* | 6/2019 | Jung | H01M 10/4285 |
| 2021/0276453 A1* | 9/2021 | Taniuchi | B60L 53/30 |

FOREIGN PATENT DOCUMENTS

| | | |
|---|---|---|
| JP | 2009-248889 A | 10/2009 |
| JP | 2015-076898 A | 4/2015 |
| JP | 2020-137380 A | 8/2020 |
| JP | 2021-022989 A | 2/2021 |
| JP | 2021-027797 A | 2/2021 |
| JP | 2021-141674 A | 9/2021 |

* cited by examiner

*Primary Examiner* — Alfonso Perez Borroto
(74) *Attorney, Agent, or Firm* — Oliff PLC

(57) ABSTRACT

A vehicle includes a battery including an all-solid-state battery configured to be externally chargeable with electric power supplied from outside of the vehicle, a heater configured to heat the battery, and a control device configured to control the heater. The control device controls the heater such that when a predetermined condition related to the external charging is satisfied, the temperature of the battery during execution of the external charging is higher than when the predetermined condition is not satisfied. The predetermined condition includes a condition that an elevation of the vehicle during the execution of the external charging is higher than a predetermined height.

9 Claims, 5 Drawing Sheets

VEHICLE AND VEHICLE CONTROL METHOD

CROSS-REFERENCE TO RELATED APPLICATION

This application claims priority to Japanese Patent Application No. 2022-181859 filed on Nov. 14, 2022, incorporated herein by reference in its entirety

BACKGROUND

1. Technical Field

The present disclosure relates to a vehicle and a vehicle control method, and more particularly to control technology for a vehicle equipped with all-solid-state batteries.

2. Description of Related Art

In recent years, research and development of all-solid-state batteries have been advanced with the aim of being mounted on vehicles. A rapid charging device of an all-solid-state battery disclosed in Japanese Unexamined Patent Application Publication No. 2021-141674 cools the all-solid-state battery when the temperature of the all-solid-state battery is equal to or higher than a predetermined temperature.

SUMMARY

Generally, an upper limit control voltage is defined for a battery mounted on a vehicle. When the voltage of the battery rises to (or near) the upper limit control voltage, charging of the battery is inhibited (for example, prohibited) to protect the battery from deterioration.

Normally, the voltage of an all-solid-state battery tends to increase during external charging, such as plug-in charging, compared to a liquid-based battery. The mechanism behind this behavior will be described in detail below. Consequently, after the external charging of the all-solid-state battery ends, the voltage tends to be high and close to the upper limit control voltage. As a result, a situation may arise in which additional charging is suppressed during traveling after the end of the external charging. If the additional charging is suppressed, it could result in insufficient regenerative braking force or decreased energy efficiency such as power consumption, fuel consumption, which may ultimately lead to a deterioration in vehicle performance. It is desirable to avoid such a situation.

The present disclosure provides a vehicle equipped with an all-solid-state battery that suppresses deterioration in vehicle performance after the end of external charging.

A vehicle of the present disclosure according a first aspect includes a battery, a heater, and a control device. The battery includes an all-solid-state battery configured to be externally chargeable with electric power supplied from the outside of the vehicle. The heater is configured to heat the battery. The control device is configured to control the heater. The control device controls the heater such that when a predetermined condition related to the external charging is satisfied, a temperature of the battery during execution of the external charging is higher than when the predetermined condition is not satisfied. The predetermined condition includes a condition that the elevation of the vehicle during the execution of the external charging is higher than a predetermined height.

When the elevation of the vehicle during the external charging is high, there is a high possibility that the vehicle will travel downhill after the end of the external charging, and the voltage that has increased due to the external charging may further increase due to regenerative charging. Therefore, in the configuration described above, when the predetermined condition including the condition that the elevation of the vehicle is higher than the predetermined height is satisfied, the battery is heated such that the temperature of the battery during the execution of the external charging is higher than it would be otherwise. By raising the temperature of the battery by heating, it is possible to reduce a voltage rise associated with external charging (details will be described below). Consequently, even when the battery voltage rises after the end of external charging, it will be difficult to reach the upper limit control voltage. Therefore, according to the configuration described above, it is possible to suppress deterioration in vehicle performance after the end of the external charging.

In the first aspect, the control device may control the heater such that the temperature of the battery approaches a target temperature, and when the predetermined condition is satisfied, sets the target temperature higher than when the predetermined condition is not satisfied.

In the first aspect, the control device may control the heater such that a heating output from the heater to the battery is higher when the predetermined condition is satisfied than when the predetermined condition is not satisfied.

In the first aspect, when the predetermined condition is satisfied, the control device may control the heater such that a temperature rise amount of the battery from the start of heating of the battery by the heater is higher than when the predetermined condition is not satisfied.

With the configuration described above, the temperature of the battery can be preferably increased by setting the target temperature, heating output or temperature rise amount of the battery as a control target.

In the first aspect, the predetermined condition may further include a condition that a state of charge (SOC) of the battery during the execution of the external charging is higher than a reference value.

In the first aspect, the predetermined condition may further include a condition that a remaining charging time until the end of the external charging is shorter than a reference time.

In the configuration, a determination on whether the external charging is near completion based on the SOC or the remaining charging time. This makes it possible to raise the temperature of the battery when the external charging is near completion (that is, when the vehicle is about to start traveling). Therefore, unnecessary heating by the heater can be eliminated, and wasteful electric power consumption can be reduced.

In the first aspect, the predetermined condition may further include a condition that the vehicle is predicted to travel downhill at a position that exceeds a reference difference in elevation after the end of the external charging.

In the configuration described above, taking the difference in elevation into account enhances the precision of predicting whether the vehicle will travel downhill after the end of external charging. This makes it possible to heat the battery only when it can be predicted with high precision that the vehicle will travel downhill after the end of the external charging.

In the first aspect, the control device may be configured to suppress charging of the battery as voltage of the battery rises.

A control method of a vehicle of the present disclosure according to a second aspect includes the vehicle equipped with a battery including an all-solid-state battery. The control method includes executing external charging for charging the battery with electric power supplied from the outside of the vehicle, and heating the battery with a heater. The battery is heated by the heater, when a predetermined condition related to the external charging is satisfied, such that the temperature of the battery during execution of the external charging is higher than when the predetermined condition is not satisfied, and the predetermined condition includes a condition that the elevation of the vehicle during the execution of the external charging is higher than a predetermined height.

With the method described above, similarly to the configuration described above, it is possible to suppress deterioration in vehicle performance after external charging ends.

With each aspect of the present disclosure, in the vehicle equipped with the all-solid-state battery, deterioration of vehicle performance after external charging ends can be suppressed.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
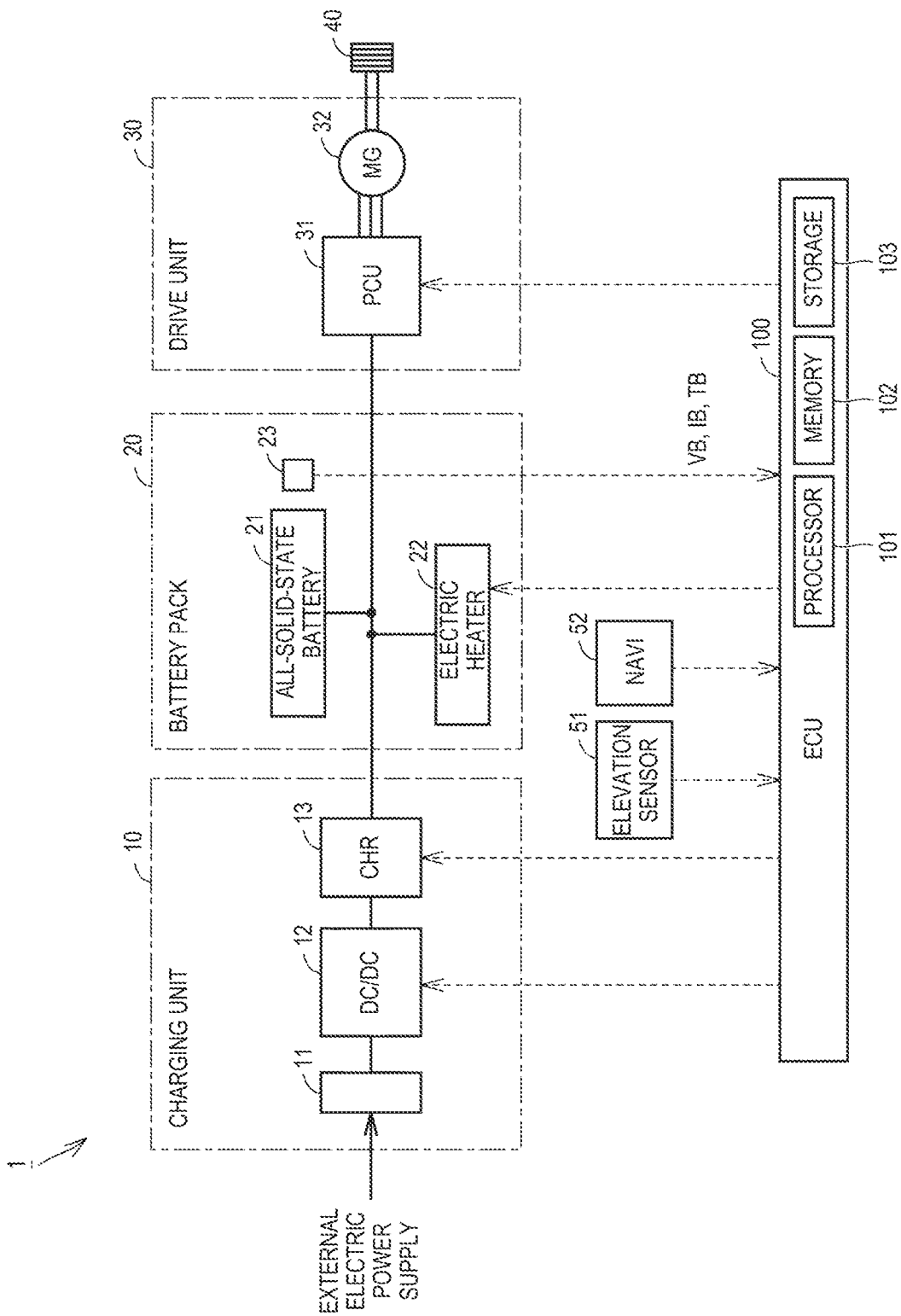
FIG. 1 is a diagram illustrating an example of an overall configuration of a vehicle according to a first embodiment of the present disclosure.

Hereinafter, embodiments of the present disclosure will be described in detail with reference to the drawings. The same or corresponding parts in the drawings are denoted by the same reference numerals, and the description thereof will not be repeated.

First Embodiment

Vehicle Configuration

FIG. 1 is a diagram illustrating an example of an overall configuration of a vehicle according to a first embodiment of the present disclosure. A vehicle 1 is configured to be externally chargeable with electric power supplied from an external electric power source (charging station or the like). External charging is plug-in charging in this example. However, the external charging may be non-contact charging. The vehicle 1 is an electric vehicle (battery electric vehicle: BEV) in this example. The vehicle 1 may be another type of vehicle such as a plug-in hybrid electric vehicle (PHEV).

The vehicle 1 includes a charging unit 10, a battery pack 20, a drive unit 30, a drive wheel 40, an elevation sensor 51, a navigation system 52, and an electronic control unit (ECU) 100. The charging unit 10 includes an inlet 11, a DC/DC converter 12, and a charging relay (CHR) 13. The battery pack 20 includes a battery 21, an electric heater 22, and a battery sensor 23. The drive unit 30 includes a power control unit (PCU) 31 and a motor generator 32.

The inlet 11 is configured such that a charging connector (not illustrated) of a charging cable is inserted therein while mechanically connected thereto by fitting or the like. The inlet 11 receives electric power supplied from an external electric power supply.

The DC/DC converter 12 is electrically connected between the inlet 11 and the charging relay 13. The DC/DC converter 12 lowers the voltage of DC electric power supplied from the external electric power supply through the inlet 11 in accordance with a control command from the ECU 100. An AC/DC converter (not illustrated) for normal charging may be provided instead of or in addition to the DC/DC converter 12 for rapid charging.

The charging relay 13 is electrically connected between the DC/DC converter 12 and the battery 21. The charging relay 13 is opened/closed according to a control command from the ECU 100. When the charging relay 13 is closed, electric power can be transferred between the inlet 11 and the battery 21.

The battery 21 is an assembled battery including a plurality of (typically several tens to several hundred) cells. Each cell is an all-solid-state battery. All-solid-state batteries can be constructed using various known materials, such as those containing a sulfide-based solid electrolyte or those containing an oxide-based solid electrolyte. The battery 21 stores electric power for driving the motor generator 32 and supplies electric power to the motor generator 32 through the PCU 31. Also, the battery 21 is charged by receiving regenerated electric power through the PCU 31 when the motor generator 32 regenerates electric power.

The electric heater 22 is, for example, a positive temperature coefficient (PTC) heater. In a low-temperature environment, the electric heater 22 heats the battery 21 using electric power supplied from an external electric power source during plug-in charging. However, the electric heater 22 may operate with electric power supplied from the battery 21.

The battery sensor 23 includes a voltage sensor, a current sensor, and a temperature sensor (none of which are illustrated). The voltage sensor detects the voltage (battery voltage VB) of the battery 21. The current sensor detects current IB that is input to and output from the battery 21. The temperature sensor detects the temperature (battery temperature TB) of the battery 21. Each sensor outputs its detection result to the ECU 100.

The PCU 31 is configured to perform bidirectional electric power conversion between the battery 21 and the motor generator 32 in accordance with a control command from the ECU 100.

The motor generator 32 is an AC rotating electrical machine, such as a three-phase AC synchronous motor in which a permanent magnet is embedded in a rotor. The motor generator 32 mainly operates as an electric motor, and receives electric power from the battery 21 to rotationally drive the drive wheel 40. On the other hand, when the vehicle 1 decelerates (during braking, traveling downhill, or the like), the motor generator 32 operates as an electric power generator to perform regenerative electric power generation. Electric power generated by the motor generator 32 is charged to the battery 21 via the PCU 31.

The elevation sensor 51 includes a barometer (not illustrated) and calculates the elevation of the vehicle 1 based on the atmospheric pressure. The elevation sensor 51 outputs the calculated elevation of the vehicle 1 to the ECU 100.

The navigation system 52 includes a global positioning system (GPS) module (not illustrated). The GPS module specifies the position of the vehicle 1 based on radio waves from artificial satellites. The navigation system 52 utilizes the position information of the specified vehicle 1 to execute navigation processing such as proposing an expected travel route, and outputs the processing result to the ECU 100.

The ECU 100 includes a processor 101, a memory 102, and a storage 103. The processor 101 is a computing device such as a central processing unit (CPU) or a micro-processing unit (MPU). The memory 102 is a volatile memory (working memory) such as a random access memory (RAM). The storage 103 is a rewritable non-volatile memory such as a flash memory. The storage 103 stores system programs including an operating system (OS) and control programs including computer-readable codes necessary for control calculations. The processor 101 implements various processes by reading the system program and the control program, loading them into the memory 102, and executing them. The ECU 100 corresponds to a "control device" according to the present disclosure. The ECU 100 may be configured to be divided into a plurality of ECUs for each function.

The main controls executed by the ECU 100 in the present embodiment include input/output control of the battery 21 and temperature raising processing using the electric heater 22. An overview of these controls/processes will be briefly described below.

Input/Output Control

Figure 2:
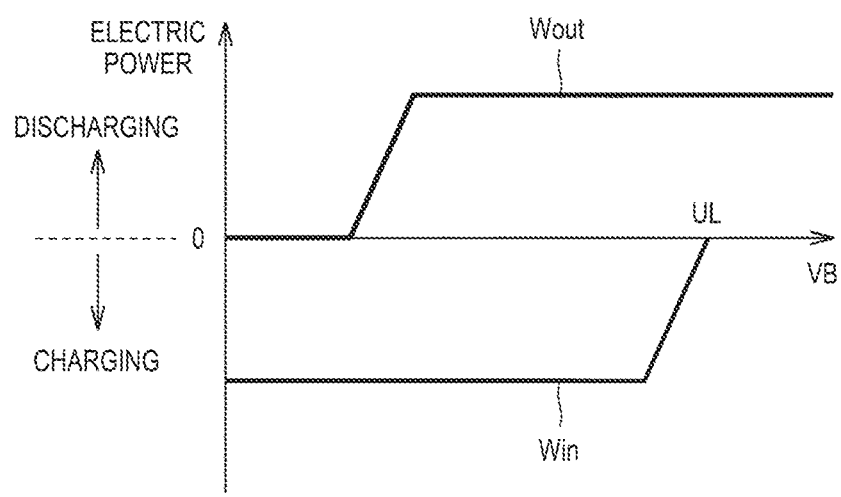
FIG. 2 is a conceptual diagram illustrating an example of battery input/output control.

FIG. 2 is a conceptual diagram illustrating an example of the input/output control of the battery 21. FIG. 2 illustrates an example of how to set the electric power input to/output from the battery 21 with respect to the voltage of the battery 21. The horizontal axis indicates the voltage (battery voltage VB) of the battery 21. The vertical axis indicates the charge/discharge electric power (input/output electric power PB) of the battery 21. Negative electric power indicates charging and positive electric power indicates discharging.

An allowable discharge electric power Wout is an upper limit control value of the electric power (discharge electric power) output from the battery 21. An allowable charge electric power Win is an upper limit control value of the electric power (charge electric power) input to the battery 21. The input/output electric power of the motor generator 32 is limited such that the input/output electric power PB of the battery 21 is within the range of Win<PB<Wout.

The allowable charge electric power Win is set to Win=0 in a region where the battery voltage VB is equal to or higher than an upper limit voltage UL. That is, charging of the battery 21 is prohibited. On the other hand, in a region where the battery voltage VB is less than the upper limit voltage UL, charging of the battery 21 is allowed by setting Win<0. The value of Win in this case is determined in advance in consideration of rated values of the battery 21 and the PCU 31, and the like. The upper limit voltage UL is determined in advance in consideration of deterioration characteristics of the battery 21 in a high state-of-charge (SOC) state.

When the battery voltage VB reaches the upper limit voltage UL, Win=0 is set and the regenerative electric power generation by the motor generator 32 is prohibited. As a result, while the deterioration of the battery 21 can be suppressed, vehicle performance can deteriorate. For example, the vehicle 1 may lack regenerative braking power.

Alternatively, it is possible that the energy efficiency will decrease because energy cannot be recovered during deceleration, and thus the electric power consumption of the vehicle 1 will deteriorate.

Temperature Raising Processing

The temperature raising processing in the present embodiment is processing of operating the electric heater 22 so that the battery temperature TB detected by the battery sensor 23 (temperature sensor) approaches a target temperature. In this example, the ECU 100 operates the electric heater 22 until the battery temperature TB reaches (or falls within a predetermined temperature range including the target temperature) the target temperature. The ECU 100 stops the electric heater 22 when the battery temperature TB reaches the target temperature. The ECU 100 operates the electric heater 22 again when the battery temperature TB falls below the target temperature (or a lower limit of the predetermined range).

Uneven Reaction

All-solid-state batteries are more prone to voltage rises than liquid-based batteries (lithium-ion batteries). More specifically, in all-solid-state batteries, in the thickness direction of a negative electrode, it is easier for the charging reaction to proceed the closer it is to a positive electrode, and it is harder for the charging reaction to proceed the farther away it is from the positive electrode. Therefore, reaction unevenness (charging unevenness) may occur in the thickness direction of the negative electrode. Reaction unevenness appears remarkably in all-solid-state batteries. This is because in all-solid-state batteries that do not contain an electrolytic solution, it is difficult to form an ion-conducting path between solid electrolytes in the thickness direction, and resistance associated with movement of ions in the thickness direction is high. When reaction unevenness occurs in an all-solid-state battery, the overvoltage generated in a region where the reaction unevenness occurs increases, thereby increasing the voltage.

Due to such characteristics of all-solid-state batteries, the battery voltage VB easily reaches the upper limit voltage UL after plug-in charging of the battery 21. Here, the inventors paid attention to the fact that when the elevation of the vehicle 1 during plug-in charging is high, the battery voltage VB can reach the upper limit voltage UL more easily. This is because when the vehicle 1 is at a high elevation, there is a high possibility that the vehicle 1 will travel downhill afterward, and the battery voltage VB, which has increased to a certain extent due to plug-in charging, may increase further due to regenerative charging associated with traveling downhill. When the battery voltage VB reaches the upper limit voltage UL, it can cause deterioration in vehicle performance as described above.

Therefore, in the present embodiment, a configuration is adopted in which the method of heating the battery 21 is changed according to the elevation of the vehicle 1 during plug-in charging. The ECU 100 controls the electric heater 22 such that when the elevation of the vehicle 1 during plug-in charging is high, the temperature (battery temperature TB) of the battery 21 becomes higher than when the elevation is low. The higher the battery temperature TB, the easier it is for the diffusion of lithium ions to proceed, and thus the uneven reaction caused by plug-in charging is easier to alleviate (eliminate). Accordingly, overvoltage is minimized, and a voltage rise due to plug-in charging can be reduced. As a result, even when the battery voltage VB rises due to regenerative charging that accompanies traveling downhill, the battery voltage VB is less likely to reach the upper limit voltage UL. As a result, deterioration in vehicle performance can be suppressed.

In the present disclosure, the elevation reference point is not limited to the height above sea level (more specifically, mean sea level). The elevation reference point can be changed as appropriate. Also, the elevation may be replaced with other terms (above sea level, altitude, or the like) representing height (height position).

Processing Flow

Figure 3:
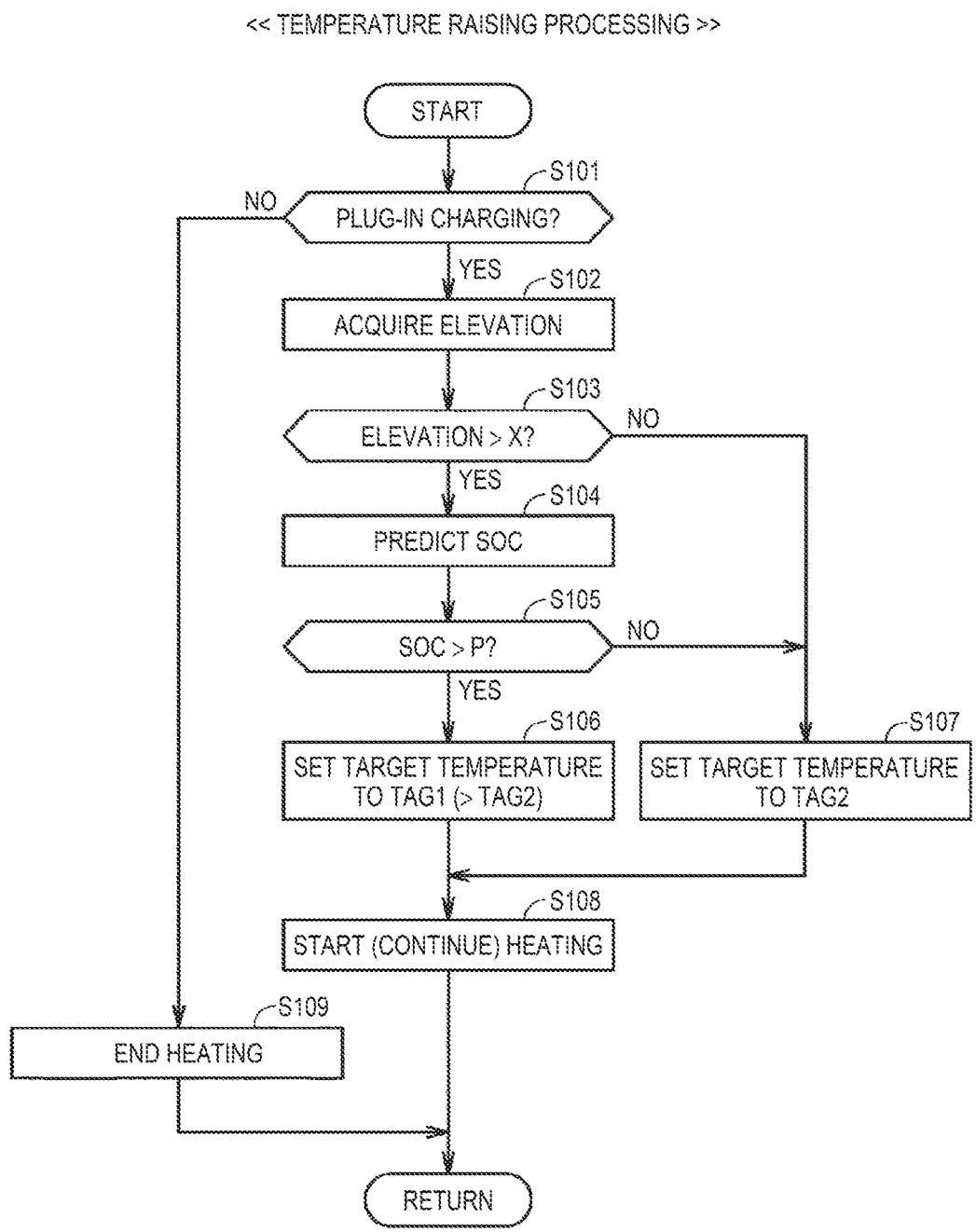
FIG. 3 is a flowchart illustrating a workflow sequence of temperature raising processing according to the first embodiment.

FIG. 3 is a flowchart illustrating a workflow sequence of temperature raising processing according to the first embodiment. The processing illustrated in this flowchart is executed when a predetermined condition is satisfied (for example, every control cycle). Here, it is assumed that the battery temperature TB is low, such as in a low-temperature environment, and it is desirable to raise the temperature of the battery 21.

Each step is realized by software processing by the ECU 100, but may be realized by hardware (electric circuit) arranged in the ECU 100. Steps are abbreviated as S below. The same applies to FIGS. 4 and 5, which will be described below.

In S101, the ECU 100 determines whether the vehicle 1 is in the middle of plug-in charging. When the vehicle 1 is in the middle of plug-in charging (YES in S101), the ECU 100 acquires the elevation of the vehicle 1 from the elevation sensor 51 (S102). The ECU 100 may acquire the elevation of the vehicle 1 based on position information of the vehicle 1 specified by the navigation system 52 and map information (information on elevation at each position) prepared in advance.

In S103, the ECU 100 determines whether the elevation acquired in S102 is higher than a predetermined height X. The height X is, for example, 500 meters above sea level, 1000 meters above sea level, 1500 meters above sea level, or the like and is determined by design. When the elevation is higher than the height X, the ECU 100 predicts the SOC of the battery 21 (S104). As the SOC prediction method, a known method such as a method using a charge/discharge curve (open circuit voltage (OCV)-SOC curve) or a current integration method can be used.

In S105, the ECU 100 determines whether the SOC predicted in S104 is higher than a reference value P. The reference value P is a value slightly (for example, 5% to 10%) lower than the SOC (for example, 90%) at which plug-in charging ends.

When the SOC is equal to or lower than the reference value P (NO in S105), the ECU 100 moves to the process to S107, and sets the target temperature for the temperature raising processing to TAG2 (ordinary temperature=25° C., for example). On the other hand, when the SOC is higher than the reference value P (YES in S105), the ECU 100 advances the process to S106, and sets the target temperature for the temperature raising processing to TAG1 (for example, 40° C.) higher than TAG2 (TAG1>TAG2).

In S108, the ECU 100 controls the electric heater 22 to start (or continue if it has already started) heating the battery 21. Then, when plug-in charging ends (NO in S101), the process proceeds to S109, and heating of the battery 21 ends. Unnecessary heating (useless electric power consumption) can be reduced by not heating the battery 21 at all times but only when the end of plug-in charging is approaching, in other words, when the vehicle 1 is about to start traveling.

In addition, in S106 and S107, when the elevation is higher than the height X, the target temperature for the temperature raising processing is set higher than when the elevation is equal to or less than the height X. However, the parameter of a control target is not limited to the target temperature, and may be the heating output [unit: W or Wh] for the battery 21 by the electric heater 22. The parameter of the control target may be the temperature rise amount of the battery 21 from the start of heating. The battery temperature TB can also be preferably raised by setting the heating output for the battery 21 and/or the temperature rise amount of the battery 21 as the control target.

As described above, in the first embodiment, when the elevation of the vehicle 1 during plug-in charging is higher than the height X, the battery temperature TB is raised by heating using the electric heater 22 compared to when the elevation is equal to or less than the height X. As a result, diffusion of lithium ions is promoted in the all-solid-state battery, and the uneven reaction is alleviated, thereby reducing overvoltage. Therefore, when the elevation is higher than the height X, the battery voltage VB at the end of plug-in charging can be made lower than when the elevation is equal to or less than the height X. As a result, even when the vehicle 1 travels downhill after plug-in charging ends, it becomes difficult for the battery voltage VB to reach the upper limit voltage UL. Therefore, according to the first embodiment, it is possible to suppress deterioration in vehicle performance after plug-in charging ends.

Modification Example of First Embodiment

In the flowchart illustrated in FIG. 3, an example of determining whether the plug-in charging is near completion based on the SOC of the battery 21 is described (see S105). The determination may be made based on the remaining plug-in charging time.

Figure 4:
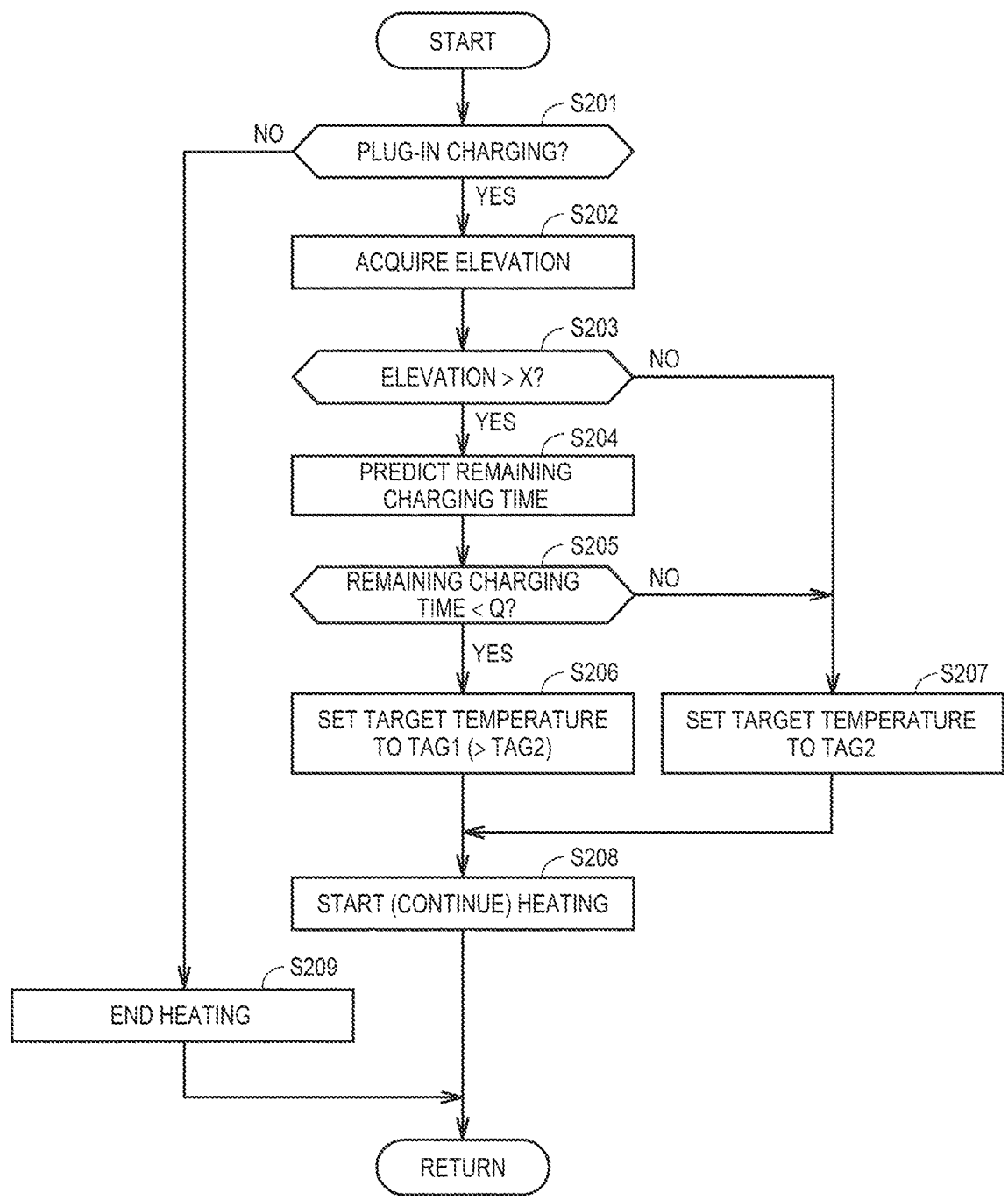
FIG. 4 is a flowchart illustrating a workflow sequence of temperature raising processing in a modification example of the first embodiment.

FIG. 4 is a flowchart illustrating a workflow sequence of temperature raising processing in a modification example of the first embodiment. The processing of S201 to S203 is similar to the processing of S101 to S103 (see FIG. 3) in the first embodiment, so the description will not be repeated.

In S204, the ECU 100 predicts the remaining time (remaining charging time) until plug-in charging ends. The remaining charging time can be predicted by a known method from a current SOC, an SOC at which the plug-in charging will end, and a charge amount per unit time. In the case of timer-charging, a time difference between the current time and a preset end time may be used as the remaining charging time.

In S205, the ECU 100 determines whether the remaining charging time predicted in S104 is shorter than a reference time Q. The reference time Q is a time (for example, five minutes to ten minutes) indicating that the plug-in charging is near completion.

When the remaining charging time is equal to or longer than reference time Q (NO in S205), the ECU 100 advances the process to S207. On the other hand, when the remaining charging time is shorter than the reference time Q (YES in S205), the ECU 100 advances the process to S206. The processing of S206 to S209 is also similar to the processing of S106 to S109 in the first embodiment, so the description will not be repeated.

Similarly to the first embodiment, the modification example of the first embodiment can also suppress deterioration in vehicle performance after the end of plug-in charging.

Second Embodiment

The first embodiment describes that the method of heating the battery 21 is changed according to the elevation of the vehicle 1. In a second embodiment, an example will be described in which the method of heating the battery 21 is changed in accordance with the elevation of the vehicle 1 as well as a difference in elevation on an expected travel route thereafter.

Figure 5:
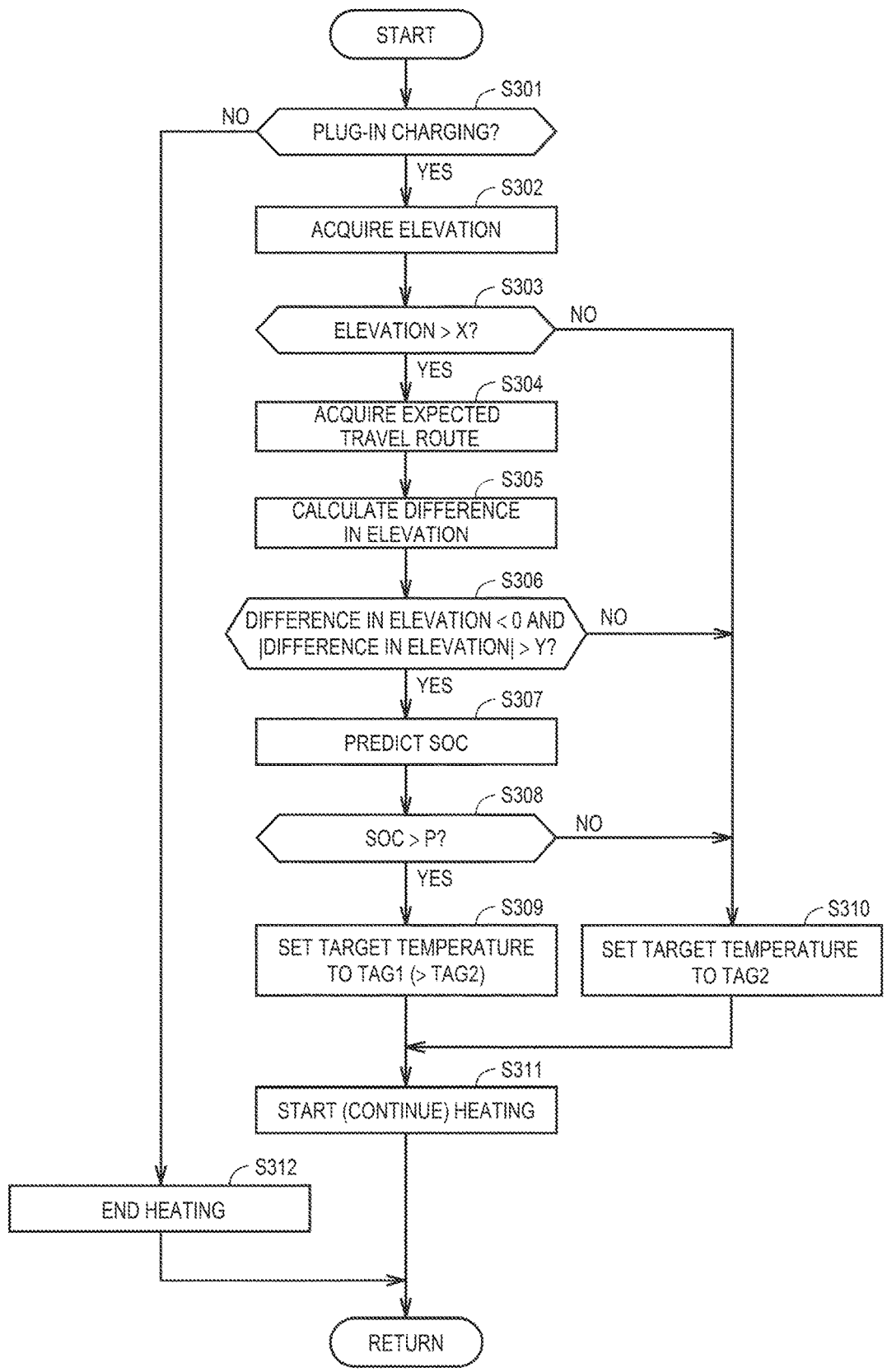
FIG. 5 is a flowchart illustrating a workflow sequence of temperature raising processing according to a second embodiment.

FIG. 5 is a flowchart illustrating a workflow sequence of temperature raising processing according to the second embodiment. The processing of S301 to S303 is similar to the processing (see FIG. 3) of S101 to S103 in the first embodiment, so the description will not be repeated.

In S304, the ECU 100 acquires the expected travel route of the vehicle 1 from the navigation system 52. The expected travel route may be manually input by a user of the vehicle 1, or may be predicted from a travel history of the vehicle 1 (route traveled many times in the past, or the like).

In S305, the ECU 100 calculates the difference in elevation on the expected travel route of the vehicle 1 based on the elevation (value acquired in S302) of a plug-in charging point of the vehicle 1 and the elevation of each point on the expected travel route of the vehicle 1. For example, the ECU 100 may calculate a difference between the elevation of the plug-in charging point and the lowest elevation on the expected travel route as the difference in elevation.

In S306, the ECU 100 determines whether the difference in elevation calculated in S305 is negative (that is, the elevation of the expected travel route is lower than the elevation of the plug-in charging point) and whether an absolute value of the difference in elevation is greater than a reference value Y (reference difference in elevation).

When the condition that the difference in elevation is negative and the absolute value of the difference in elevation is greater than the reference value Y is not satisfied (NO in S306), the ECU 100 advances the process to S310. On the other hand, when the above-described condition is satisfied (YES in S306), the ECU 100 advances the process to S307. The processing of S307 to S312 is similar to the processing of S104 to S109 in the first embodiment, so the description will not be repeated. In the second embodiment, as in the modification example of the first embodiment, a determination on whether the plug-in charging is near completion based on the remaining charging time.

Similarly to the first embodiment, the second embodiment can also suppress deterioration in vehicle performance after the end of plug-in charging. In addition to that, in the second embodiment, the method of heating the battery 21 is changed in consideration of the difference in elevation on the expected travel route of the vehicle 1. Taking the difference in elevation into account enhances the precision of predicting whether the vehicle 1 will travel downhill after the end of plug-in charging. This makes it possible to heat the battery 21 only when it is predicted with high precision that the vehicle 1 will travel downhill after the end of plug-in charging. Even when the vehicle 1 does not travel downhill, an effect of suppressing deterioration in vehicle performance due to the increase in the battery temperature TB can be obtained.

The embodiments disclosed this time should be considered as examples and not restrictive in all respects. The scope of the present disclosure is indicated by the scope of claims rather than the description of the embodiments described above, and is intended to include all modifications within the scope and meaning equivalent to the scope of the claims.

What is claimed is:

1. A vehicle, comprising:
a battery including an all-solid-state battery configured to be externally chargeable with electric power supplied from outside of the vehicle;
a heater configured to heat the battery; and
a control device configured to control the heater, wherein:
the control device controls the heater such that a temperature of the battery during execution of an external charging is higher when a predetermined condition related to the external charging is satisfied than when the predetermined condition is not satisfied; and
the predetermined condition includes a condition that an elevation of the vehicle during the execution of the external charging is higher than a predetermined height.

2. The vehicle according to claim 1, wherein
the control device:
controls the heater such that the temperature of the battery approaches a target temperature; and
sets the target temperature higher when the predetermined condition is satisfied than when the predetermined condition is not satisfied.

3. The vehicle according to claim 1, wherein
the control device controls the heater such that a heating output from the heater to the battery is higher when the predetermined condition is satisfied than when the predetermined condition is not satisfied.

4. The vehicle according to claim 1, wherein
the control device controls the heater such that a temperature rise amount of the battery from a start of heating of the battery by the heater is higher when the predetermined condition is satisfied than when the predetermined condition is not satisfied.

5. The vehicle according to claim 1, wherein
the predetermined condition further includes a condition that a state of charge of the battery during the execution of the external charging is higher than a reference value.

6. The vehicle according to claim 1, wherein
the predetermined condition further includes a condition that a remaining charging time until an end of the external charging is shorter than a reference time.

7. The vehicle according to claim 1, wherein
the predetermined condition further includes a condition that the vehicle is predicted to travel downhill at a position that exceeds a reference difference in elevation after an end of the external charging.

8. The vehicle according to claim 1, wherein
the control device is configured to suppress charging of the battery as voltage of the battery rises.

9. A control method of a vehicle equipped with a battery including an all-solid-state battery, comprising:
executing external charging for charging the battery with electric power supplied from outside of the vehicle; and
heating the battery with a heater, wherein:
the battery is heated by the heater such that a temperature of the battery during execution of the external charging is higher when a predetermined condition related to the external charging is satisfied than when the predetermined condition is not satisfied; and
the predetermined condition includes a condition that an elevation of the vehicle during the execution of the external charging is higher than a predetermined height.

\* \* \* \* \*